United States Patent Office 3,268,916
Patented August 30, 1966

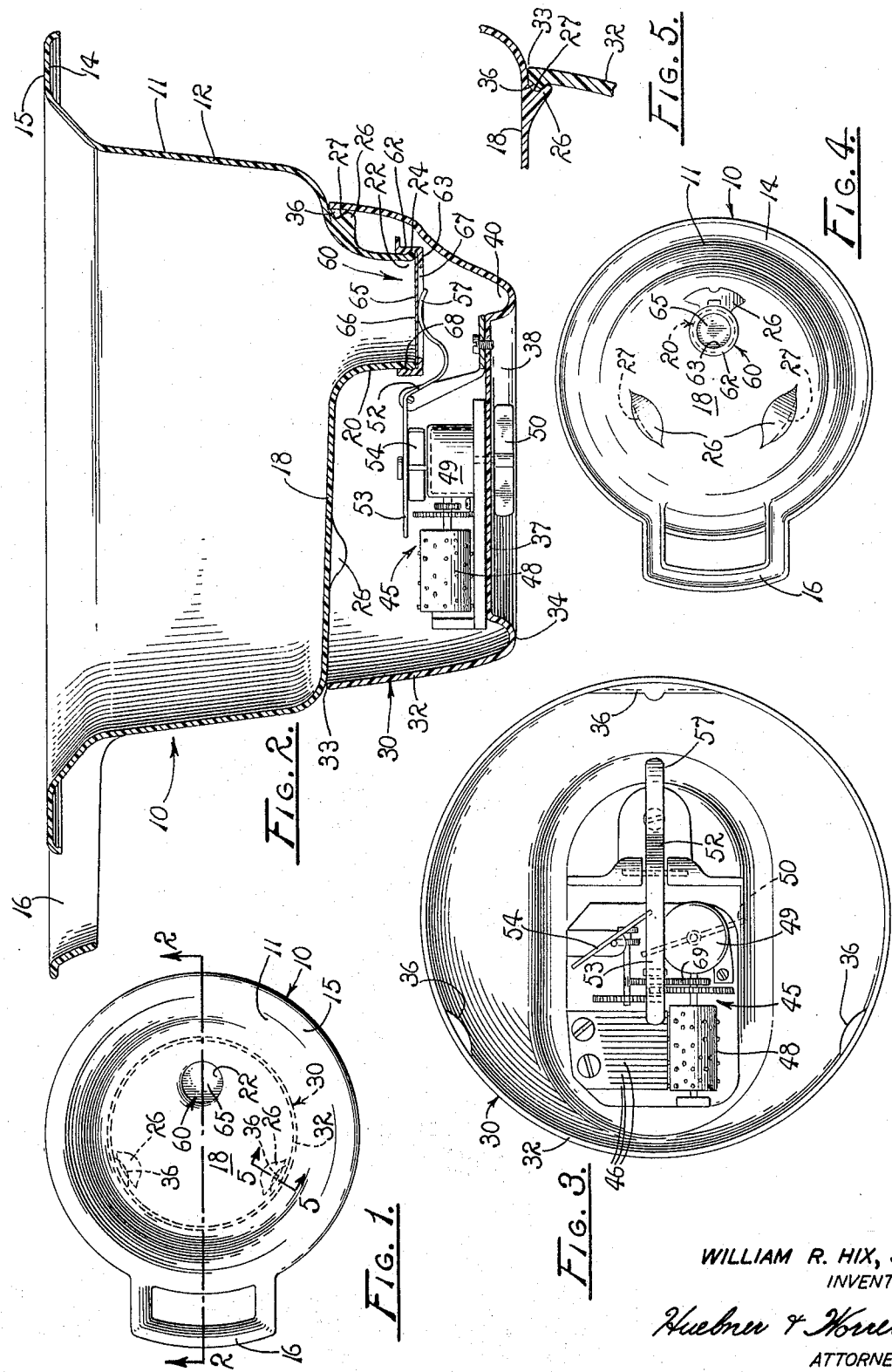

3,268,916
NURSERY TRAINING DEVICE
William R. Hix, Jr., 1339 Grandview Ave., Ceres, Calif.
Filed May 21, 1963, Ser. No. 282,056
2 Claims. (Cl. 4—138)

The present invention relates to a nursery training device and more particularly to such a device for training infants in orderly habits of elimination.

Many problems are experienced during the training of infants in acceptable toilet practice. Such training is usually initiated between the infant's first and second years. At such age, the infant is unable to communicate so that it is difficult for the trainer accurately to determine when elimination is to occur. As a result, the infant must usually remain on the training device for extended periods as frequently the infant completes elimination without the trainer's knowledge. It has been found that most infants react with hostility toward such enforced and extended periods on the training device and therefore are not likely voluntarily to indicate their need to use such device. Musical sound-producing devices have been employed with such nursery training devices to make their use more pleasant and entertaining to infants as well as to provide an audible signal to the trainer that elimination is completed. However, the musical devices heretofore employed on conventional training devices have not been fully successful. This has been due primarily to the difficulty in providing a workable triggering mechanism for the audible signal. The musical device must be adequately sealed against contamination by the eliminative material while the trigger connected thereto must be placed in the path of such material. Therefore, the trigger and musical device are usually connected through complicated, troublesome linkages requiring precision, continual adjustment and tedious cleaning. Also, such musical devices heretofore in use provide only a single alarm signal or if the device is capable of sustaining the signal as in devices providing a musical tune, an interlock mechanism must be provided. Furthermore, such conventional arrangements are readily accessible to tampering by infants during and between periods of use.

Therefore, it is a broad object of the present invention to provide an improved nursery training device.

Another object is to provide such a training device providing improved training of infants in orderly habits of elimination.

Another object is to provide a nursery training device which is effective to minimize the occurrence of prolonged periods of use.

Another object is to provide a nursery training device which, as an incentive to use, automatically provides a pleasing sound upon completion of elimination.

Another object is to provide a nursery training device having a musical sound-producing apparatus disposed therein which provides an audible signal when elimination is accomplished.

Another object is to provide a nursery training device having a musical device therein which is substantially inaccessible and virtually tamper-proof.

Another object is to provide such a device which has improved sanitary features.

Another object is to provide a nursery training device which is readily adapted for use with conventional nursery training chairs or which may be used independently thereof.

Other objects and advantages of the present invention will subsequently become more clearly apparent upon reference to the following description in the specification.

In the drawing:

FIG. 1 is a top plan view of the nursery training device embodying the principles of the present invention.

FIG. 2 is a somewhat enlarged transverse vertical section through a receptacle and base member of the nursery training device, taken on line 2—2 of FIG. 1.

FIG. 3 is a somewhat enlarged top plan view of the base member removed from the receptacle of FIG. 2.

FIG. 4 is a somewhat reduced bottom plan view of the receptacle of FIG. 2 with the base member removed.

FIG. 5 is a somewhat enlarged fragmentary section through the connection between the receptacle and base member taken on line 5—5 of FIG. 1.

Referring more particularly to the drawing, a nursery training device embodying the principles of the present invention is shown at 10. The training device provides a receptacle 11 having a continuous circular wall 12. The wall includes an upper outwardly extended annular flange portion 14 circumscribing the receptacle to provide an upper seat surface 15. An integral handle 16 is radially outwardly extended from the flange 14. The wall 12 of the receptacle further includes an integral bottom 18. The bottom of the receptacle has an integral constricted nozzle portion 20 providing an opening 22 into the receptacle eccentrically of the wall 12 of the receptacle. An outer annular lip 24 is formed in circumscribing relation about the opening 22. The bottom also includes a plurality of protuberances 26 extended therefrom, each of which has an arcuate groove 27 therein disposed along a circle concentric with the wall 12 of the receptacle.

A base member 30 is associated with the receptacle 11 and provides a substantially disc-shaped wall 32 having an upper edge 33 and a lower edge 34. A plurality of integral catch members 36 are inwardly extended from the base and are spaced from each other in corresponding relation to the spacing between the protuberances 26 on the bottom 18 of the receptacle 11. The wall 32 of the base member further includes a lower wall 37 disposed upwardly from the lower edge 34 to form a recess 38. The lower wall 37 also forms an inner groove 40 between the wall 32 and the lower wall 37.

A musical sound-producing device 45 is mounted on the lower wall 37 within the wall 32 of the base member. The musical device conveniently provides a plurality of flexible metal reeds 46 which selectively engage a pegged cylinder 48. The cylinder is driven through a gear train 69 by a mechanically windable spring motor 49 provided with a key 50 disposed within the recess 38 of the base member. A trigger 52 is pivotally mounted on the musical apparatus and provides a locking end 53 engageable with a fly wheel 54 also rotated by the cylinder gear train. The trigger also provides an opposite actuating end 57 disposed immediately below the opening 22 into the nozzle portion 20 of the receptacle 11.

A pressure sensitive device 60 is associated with the receptacle 11. The pressure sensitive device provides an annular ring 62 having a lower inwardly extended flange portion 63. A diaphragm 65 of resiliently flexible material such as rubber, neoprene plastic or the like has an upper surface 66 and an opposite lower surface 67. The peripheral portion of the lower surface 67 is supported on the flange portion of the annular ring. The ring includes an annular inwardly extended ledge 68 which snaps over the lip 24 of the nozzle portion 20 of the receptacle to hold the ring and diaphragm in place over the opening 22.

Operation

The operation of the described embodiment of the subject invention is believed to be clearly apparent and is briefly summarized at this point. The nursery training device 10 is readily adapted for use with conventional nursery training chairs, not shown, which usually provide rail members below the seat opening thereof. The flange 14 of the receptacle wall 12 is engageable with such rails slidably to position the receptacle beneath the seat opening. Also, it is readily apparent that the nursery training device 10 may be used independently of such a nursery training chair by merely resting the receptacle 11 on any suitable support surface on the lower edge 34 of the base member 30.

In either instance, before such use, the diaphragm 65 is assembled in covering relation to the opening 22 in the nozzle portion 20 of the receptacle by snapping the annular ring 62 over the tip 24 of the nozzle. Such assembly permits the use of various diaphragm materials to provide the desired pressure sensitivity. The base member 30 is then assembled on the receptacle 11 by snapping the catch members 36 over their corresponding protuberances 26 on the bottom 18 of the receptacle. As best shown in FIG. 2, with the base member so assembled, the actuating end 57 of the trigger is positioned against the lower surface 67 of the diaphragm. In such position, the locking end 53 of the trigger engages the fly wheel 55 of the musical device frictionally to hold the fly wheel against rotation. Such action locks the gear train and the pegged cylinder 48 to prevent operation of the musical device 45.

Upon contact of even the most minute amount of eliminative material against the upper surface 66 of the diaphragm 65, the diaphragm is flexed downwardly within the base member 30. With such action, the actuating end 57 of the trigger is pivoted by the diaphragm to lift the locking end 53 upwardly off of the fly wheel 55 of the musical device 45. The fly wheel is then free to rotate to permit rotation of the pegged cylinder 48 through the gear train connected to the spring motor 49. With engagement of the pegs on the cylinder against the reeds 46, a musical tune is produced. Rotation of the cylinder continues as long as the diaphragm is flexed and until the spring motor 49 is unwound. After use, the receptacle 11 may be emptied and cleaned in the conventional manner without removing the base member 30, if desired. If any leakage around the diaphragm occurs during use, such leakage is constrained in the trough 40 around the lower wall 37 to preclude contamination of the musical device 45. If any such accumulation occurs, the base member 30 is easily removed from the receptacle by separation of the protuberances 26 and the catch members 36 for proper cleaning and even sterilization.

In view of the foregoing, it is readily apparent that the structure of the present invention provides an improved nursery training device which automatically produces a pleasing musical tune as an incentive for infants to use such device while also providing an audible signal to the trainer that the desired function has been performed. Also, the diaphragm structure of the present invention is sensitive to the slightest pressure since the trigger of the musical device need only be moved out of frictional engagement with the power train of the musical device to actuate the sound mechanism.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A nursery training device comprising a receptacle having a continuous circular wall, an upper outwardly extending flanged seat portion and an opposite bottom portion, said bottom portion of the receptacle having an integral tubular nozzle eccentrically related to said wall and providing a downwardly disposed constricted opening from said bottom portion of the receptacle; a base member detachably mounted on the bottom of said receptacle in circumscribing relation to said nozzle of the receptacle; a musical device mounted on said base member having a trigger providing a locking end and an opposite actuating end disposed beneath said opening of the nozzle; and a diaphragm of resiliently flexible material and having an upstanding annular ring about the rim thereof, said annular ring detachably mounting the diaphragm on the end of said nozzle in closing relation to the opening therethrough in a substantially flat condition and in constant engagement with the actuating end of said trigger to energize the musical device immediately incident to contact of eliminative material with the diaphragm.

2. A nursery training device comprising a receptacle adapted to receive eliminative material having a continuous circular wall, an upper outwardly extended flanged seat portion and an opposite bottom portion, said bottom portion of the receptacle having an integral tubular nozzle eccentrically related to said wall and providing a downwardly disposed constricted opening from said bottom portion of the receptacle, said nozzle including an annular lip circumscribing the opening therethrough; a base member detachably mounted on the bottom of said receptacle in circumscribing relation to said nozzle of the receptacle; a musical device mounted on said base member having a trigger providing a locking end and an opposite actuating end disposed beneath said opening of the nozzle; a diaphragm of resiliently flexible material; and an annular ring receiving said diaphragm in a substantially flat condition providing an annular inwardly extended ledge disposable over said lip of the nozzle for mounting the diaphragm in fluid sealing relation to said opening through the nozzle in a position continuously to engage said actuating end of the trigger to energize the musical device immediately incident to contact of eliminative material with the diaphragm.

References Cited by the Examiner

FOREIGN PATENTS 1,013,402  8/1957  Germany.
335,889    3/1959  Switzerland.

LAVERNE D. GEIGER, *Primary Examiner.*

H. GROSS, *Assistant Examiner.*